United States Patent
Hosseini et al.

(10) Patent No.: US 11,758,549 B2
(45) Date of Patent: Sep. 12, 2023

(54) TECHNIQUES FOR HANDLING COLLISION IN SCHEDULED WIRELESS COMMUNICATIONS

(71) Applicant: QUALCOMM Incorporated, San Diego, CA (US)

(72) Inventors: Seyedkianoush Hosseini, San Diego, CA (US); Rajat Prakash, San Diego, CA (US); Aamod Khandekar, San Diego, CA (US); Wei Yang, San Diego, CA (US); James Beckman, La Jolla, CA (US); Enoch Shiao-Kuang Lu, San Diego, CA (US); Vinay Joseph, Calicut (IN); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/141,795

(22) Filed: Jan. 5, 2021

(65) Prior Publication Data

US 2021/0227574 A1 Jul. 22, 2021

Related U.S. Application Data

(60) Provisional application No. 62/962,083, filed on Jan. 16, 2020.

(51) Int. Cl.
*H04W 72/14* (2009.01)
*H04W 72/23* (2023.01)
(Continued)

(52) U.S. Cl.
CPC ........ *H04W 72/23* (2023.01); *H04W 72/044* (2013.01); *H04W 72/21* (2023.01); *H04W 72/569* (2023.01)

(58) Field of Classification Search
None
See application file for complete search history.

(56) References Cited

U.S. PATENT DOCUMENTS 10,908,299 B1 * 2/2021 Tadayon ............... G01S 5/0294
11,304,223 B2 * 4/2022 Loehr ............... H04W 72/1289
(Continued)

FOREIGN PATENT DOCUMENTS

WO  WO-2019246285 A1 * 12/2019 ........... H04L 1/0001
WO  WO-2020030424 A1 *  2/2020 ........... H04W 24/04
(Continued)

OTHER PUBLICATIONS

Huawei, et al., "Intra-UE transmission Prioritization Multiplexing", GPP Draft, 3GPP TSG RAN WG1 Meeting #96, R1-1903081, 3rd Generation Partnership Project (3GPP), Mobie Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019 (Feb. 16, 2019), XP051600777, 12 Pages, Retrieved from the Internet URL: http://www.3gpp.org/ftp/tsg%5Fran/WG1%5FRL1/TSGR1%5F96/Docs/R1%2D1903081%2Ezip [retrieved on Feb. 16, 2019] pp. 1-4, 3 Intra-UE UL Prioritization—Resource Conflict between Configure and Dynamic Grants UL intra-UE multiplexing p. 4, 4 Intra-UE UL Prioritization—Resource Conflict between Dynamic Grants pp. 4-5, 5 UCI Multiplexing.
(Continued)

*Primary Examiner* — Kodzovi Acolatse
(74) *Attorney, Agent, or Firm* — Arent Fox, LLP

(57) ABSTRACT

Aspects described herein relate to configuring devices with multiple uplink grants, where the devices may be able to determine whether to interrupt communications of one uplink grant for communications of another uplink grant.

20 Claims, 6 Drawing Sheets

(51) Int. Cl.
*H04W 72/044* (2023.01)
*H04W 72/21* (2023.01)
*H04W 72/566* (2023.01)

(56) References Cited

U.S. PATENT DOCUMENTS

| | | | | |
|---|---|---|---|---|
| 2019/0334834 | A1* | 10/2019 | Yu | H04W 28/14 |
| 2020/0146045 | A1* | 5/2020 | Loehr | H04W 72/1289 |
| 2021/0058952 | A1* | 2/2021 | Li | H04L 1/1887 |
| 2021/0160890 | A1* | 5/2021 | Selvanesan | H04W 24/10 |
| 2021/0227574 | A1* | 7/2021 | Hosseini | H04W 72/1289 |
| 2021/0266953 | A1* | 8/2021 | Pelletier | H04W 72/1268 |
| 2022/0224438 | A1* | 7/2022 | Park | H04W 72/0453 |

FOREIGN PATENT DOCUMENTS

| | | | | |
|---|---|---|---|---|
| WO | WO-2020144403 A1 * | 7/2020 | | |
| WO | WO-2020223448 A1 * | 11/2020 | | H04L 5/0053 |
| WO | WO-2021067839 A1 * | 4/2021 | | H04L 1/0025 |

OTHER PUBLICATIONS

International Search Report and Written Opinion—PCT/US2021/012353—ISA/EPO—dated Apr. 23, 2021.
Nokia, et al., "On Intra-UE DL/UL Prioritization for NR URLLC", 3GPP Draft 3GPP TSG RAN WG1 Meeting #96, R1-1901917_NR_URLLC_INTRA_UE, 3rd Generation Partnership Project (3GPP), Mobile Competence Centre, 650, Route Des Lucioles; F-06921 Sophia-Antipolis Cedex; France, vol. RAN WG1, No. Athens, Greece, Feb. 25, 2019-Mar. 1, 2019, Feb. 15, 2019 (Feb. 15, 2019), XP051599611, 11 Pages, Retrieved from the Internet URL: http//www.3gpp.org/ftp/tsg%5Fran/WG1%5FRL1/TSGR1%5F96/Docs/R1%2D1901917%2Ezip [retrieved on Feb. 15, 2019] p. 1, 1 Introduction pp. 3-10, 3 Discussion on intra-UE UL prioritization.
QUALCOMM Inc: "Intra-UE DL/UL Priorization Framework and RAN1 Impacts", 3GPP Draft, 3GPP TSG RAN WG2 Meeting #107, R2-1910736 INTRA-UE Prioritization Framework and RAN1 Impacts, 3rd Generation Partnership Project (3GPP), Mobile Competence Centre, 650, Route Des Luciloes, F-06921 Sophia-Antipolis Cedex, vol. RAN WG2, No. Prague, Czech Republic; Aug. 26, 2019-Aug. 30, 2019, Aug. 16, 2019 (Aug. 16, 2019), XP051768504, 14 Pages, Retrieved from the Internet: URL: http://www.3gpp.org/ftp/tsg_ran/WG2_RL2/TSGR2_107/Docs/R2-1910736.zip [retrieved on Aug. 16, 2019 pp. 9-12, 4 Intra-UE prioritization: RAN1 impacts.
Spreadtrum Communications: "Discussion on CG and Collision or Equal Priority", 3GPP Draft; GPP TSG RAN WG2 Meeting #107bis, R2-1912247 Discussion on CG and CG Collision of Equal Priority, 3rd Generation Partnership Project (3GPP), Mobile Competence Centre; 650, Route Des Ludoles; F-06921 Sophia-Antipolis Cedex, vol. RAN WG2, No. Chongqing, China, Oct. 14, 2019-Oct. 18, 2019, Oct. 1, 2019 (Oct. 1, 2019), XP051803611, 3 Pages Retrieved from the Internet: URL: https://ftp.3gpp.org/tsg_ran/WG2_RL2/TSGR2_107bis/Docs/R2-1912247.zip R2-1912247 Discussion on CG and CG collision of equal priority.doc XP051803611 [retrieved on Oct. 1, 2019] the whole document.

* cited by examiner

TECHNIQUES FOR HANDLING COLLISION IN SCHEDULED WIRELESS COMMUNICATIONS

CLAIM OF PRIORITY UNDER 35 U.S.C. § 119

The present Application for Patent claims priority to Provisional Patent Application No. 62/962,083, entitled "TECHNIQUES FOR HANDLING COLLISION IN SCHEDULED WIRELESS COMMUNICATIONS" filed Jan. 16, 2020, which is assigned to the assignee hereof and hereby expressly incorporated by reference herein for all purposes.

BACKGROUND

Aspects of the present disclosure relate generally to wireless communication systems, and more particularly, to communications scheduled using resource grants.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In many wireless communication technologies, base stations (e.g., gNBs) schedule devices (e.g., UEs) for transmitting signals to, or receiving signals from, the base stations over resources associated with one or more channels. The base stations can schedule UEs via a configured grant (CG), which can be semi-statically configured to the UE in radio resource control (RRC) signaling. The base stations can also schedule UEs dynamically via a dynamic resource grant, which can be configured using downlink control information (DCI) transmitted over a downlink control channel.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes transmitting, to a base station, a first uplink communication based on a first uplink grant, receiving, from the base station, a second uplink grant for transmitting a second uplink communication, wherein resources of the second uplink grant overlap with resources of the first uplink grant, determining to interrupt the first uplink communication to transmit the second uplink communication based on the second uplink grant, and transmitting, to the base station and based on determining to interrupt the first uplink communication, the second uplink communication over the resources of the second uplink grant including at least a portion of resources that overlap with the resources of the first uplink grant.

In another example, a method for wireless communications is provided. The method includes transmitting, to a device, a first uplink grant indicating resources over which to transmit a first uplink communication, determining whether the device is capable of interrupting low priority uplink communications to transmit high priority uplink communications, generating, based on whether the device is capable of interrupting, a second uplink grant indicating resources over which to transmit a second uplink communication, and transmitting, to the device, the second uplink grant.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an example, an apparatus for wireless communication is provided that includes a transceiver, a memory configured to store instructions, and one or more processors communicatively coupled with the memory and the transceiver. The one or more processors are configured to transmit, to a base station, a first uplink communication based on a first uplink grant, receive, from the base station, a second uplink grant for transmitting a second uplink communication, wherein resources of the second uplink grant overlap with resources of the first uplink grant in time or frequency, determine to interrupt the first uplink communication to transmit the second uplink communication based on the second uplink grant, and transmit, to the base station and based on determining to interrupt the first uplink communication, the second uplink communication over the resources of the second uplink grant including at least a portion of resources that overlap with the resources of the first uplink grant.

In another example, an apparatus for wireless communication is provided that includes a transceiver, a memory configured to store instructions, and one or more processors communicatively coupled with the memory and the transceiver. The one or more processors are configured to transmit, to a device, a first uplink grant indicating resources over which to transmit a first uplink communication, determine whether the device is capable of interrupting low priority uplink communications to transmit high priority uplink communications, generate, based on whether the device is capable of interrupting, a second uplink grant indicating resources over which to transmit a second uplink communication, and transmit, to the device, the second uplink grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
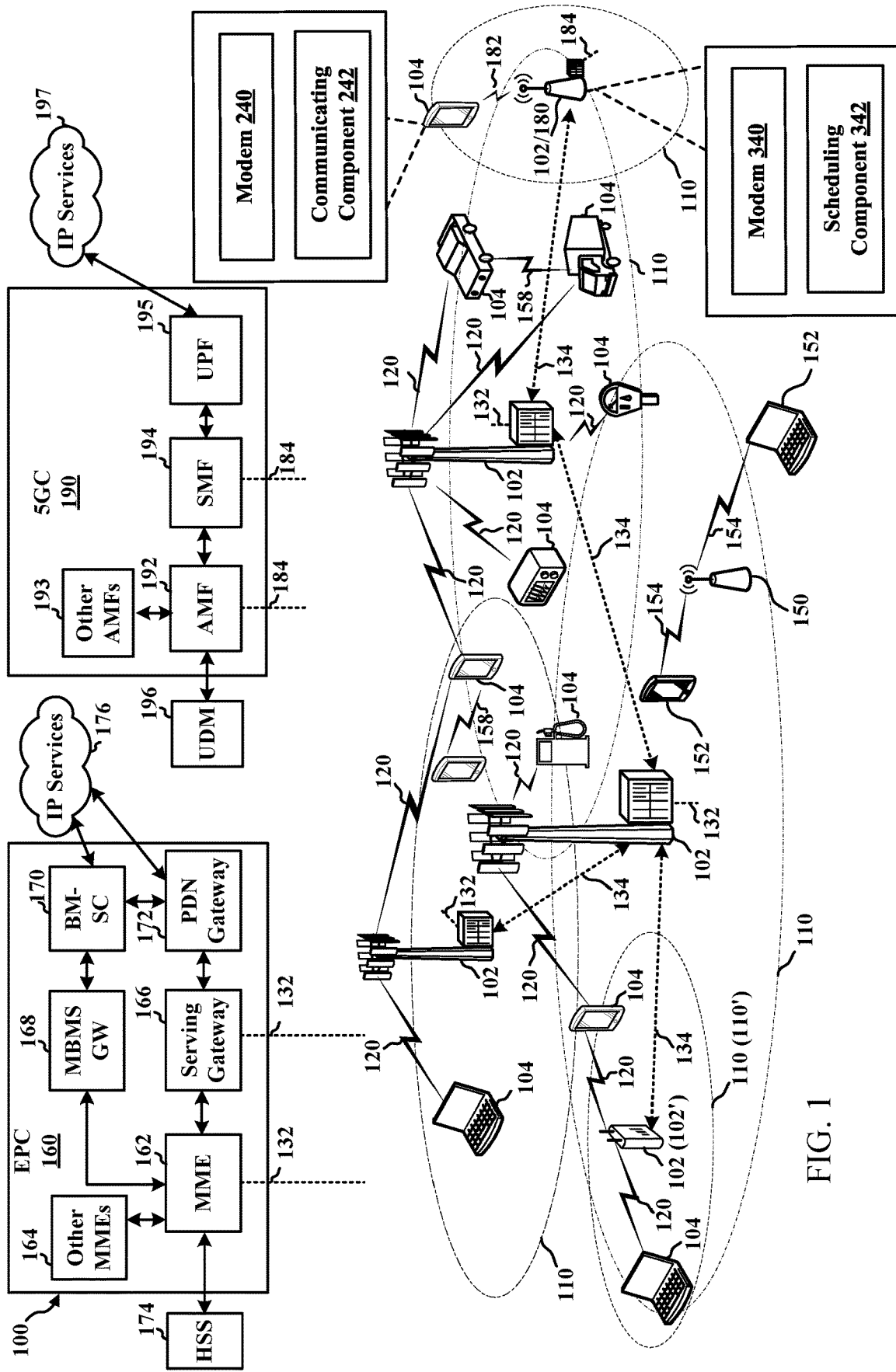
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to mechanisms for handling collisions in scheduled wireless communications. In certain wireless communication technologies, such as third generation partnership project (3GPP) long term evolution (LTE), fifth generation (5G) new radio (NR), etc., base stations can schedule devices for communicating therewith via configuration of one or more resource grants. There can be multiple types of resource grants defined and available in a given wireless communication technology, such as configured grants (CGs) and dynamic grants (DGs). In 5G, for example, a base station (e.g., gNB) can semi-statically configure a CG for a device (e.g., a user equipment (UE)) using radio resource control (RRC) signaling. The CG may be defined over certain resources (e.g., frequency and/or time resources) and may be associated with a periodic or other trigger-based allocation. LTE similarly defines semi-persistent signaling (SPS) grants. In addition, in 5G and LTE, a base station can dynamically schedule DGs by transmitting a resource grant using a control channel (e.g., physical downlink control channel (PDCCH)), which can be used to indicate a downlink control information (DCI) format indicative of the resource grant. Resource grants can generally configure uplink or downlink resources for the devices to transmit or receive, respectively, communications to/from the base station. It may be possible, however, that a base station configures a CG for a device and then also transmits a DG indicating resources that at least partially overlap resources of the CG in frequency and/or over a period of time. For example, the period of time may include a symbol, such as an orthogonal frequency division multiplexing (OFDM) symbol, single-carrier frequency division multiplexing (SC-FDM) symbol, and/or the like, a slot including a collection of symbols, a subframe including multiple slots, etc.

In 3GPP Release 15, for example, section 6.1 of 3GPP Technical Specification (TS) 38.214 indicates that "[a] UE is not expected to be scheduled by a PDCCH ending in symbol i to transmit a physical uplink shared channel (PUSCH) on a given serving cell overlapping in time with a transmission occasion, where the UE is allowed to transmit a PUSCH with configured grant according to [10, TS38.321], starting in a symbol j on the same serving cell if the end of symbol i is not at least $N_2$ symbols before the beginning of symbol j. The value $N_2$ in symbols is determined according to the UE processing capability defined in Subclause 6.4, and $N_2$ and the symbol duration are based on the minimum of the subcarrier spacing corresponding to the PUSCH with configured grant and the subcarrier spacing of the PDCCH scheduling the PUSCH." This section also indicates that "[a] UE is not expected to be scheduled by a PDCCH ending in symbol i to transmit a PUSCH on a given serving cell for a given hybrid automatic repeat/request (HARD) process, if there is a transmission occasion where the UE is allowed to transmit a PUSCH with configured grant according to [10, TS38.321] with the same HARQ process on the same serving cell starting in a symbol j after symbol i, and if the gap between the end of PDCCH and the beginning of symbol j is less than $N_2$ symbols. The value $N_2$ in symbols is determined according to the UE processing capability defined in Subclause 6.4, and $N_2$ and the symbol duration are based on the minimum of the subcarrier spacing corresponding to the PUSCH with configured grant and the subcarrier spacing of the PDCCH scheduling the PUSCH."

In 3GPP Release 16, however, multiple priority levels are introduced for different channels including DG-PUSCH and CG-PUSCH. In a specific example, low priority and high priority are introduced for each channel. For DG-PUSCH, the priority can be indicated via a bit-field in a DCI indicating the DG, and for CG-PUSCH, the priority can be indicated via RRC signaling and/or as part of CG-PUSCH configuration. In an example, it may be possible that a base station schedules a high priority (HP) DG-PUSCH and a low priority (LP) CG-PUSCH in overlapping resources, where the base station decides to grant an urgent PUSCH to the UE via the HP DG-PUSCH. In another example, it may be possible that a base station schedules a LP DG-PUSCH and a HP CG-PUSCH in overlapping resources (e.g., resources that overlap in time and/or frequency), where the base station has configured frequency resources for HP CG-PUSCH, however the HP traffic may not be periodic or deterministic. In this example, to increase resource efficiency, the base station may decide to reuse some of the resources for LP traffic. For example, the base station may not know when the UE may use the CG resources for uplink transmission.

Aspects described herein relate to handling collision of different priority uplink transmissions in overlapping CG and DG resources. In one example, a UE or base station may determine that the HP PDCCH can be received at least $N_2$ symbols before the first symbol (in time) of the LP CG-PUSCH resource, and/or where the LP PDCCH can be received at least $N_2$ symbols before the first symbol of the HP CG-PUSCH resource. In another example, for one or more of the above scenarios, the UE can interrupt transmission of an ongoing LP transmission in favor of a HP transmission, such that the UE can stop transmission of the LP transmission starting from the first overlapping time period (e.g., symbol). In an example, the concepts described herein can be applied for multiple types of CG, such as a type 1 CG (e.g., a CG that is indicated in RRC signaling and assumed active) and a type 2 CG (e.g., a CG that is indicated in RRC signaling and separately activated using DCI). In one specific example, for type 2 CG, concepts described herein can be applied to all PUSCH transmissions of type 2 CG except the first one after activation (e.g., which may have highest priority). For example, the first type 2 CG after activation may be considered a DG PUSCH and thus may follow any collision rules for two DG PUSCH transmissions. Moreover, in an example, the UE can indicate a capability to support the collision handling, and the base station and/or UE can determine how to handle collisions based on the indicated capability. Thus, possible collisions between LP and HP traffic can be handled or resolved in this regard.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for determining whether to interrupt lower priority uplink communications to transmit higher priority uplink communications, and some nodes may have a modem 340 and scheduling component 342 for scheduling devices with multiple uplink resource grants, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 of a base station 102 can configure one or more UEs 104 with multiple uplink resource grants, which may include CGs or DGs of varying priority that may at least partially overlap in time and/or frequency. Communicating component 242 of a UE 104 can receive multiple uplink resource grants from the base station 102 and can determine whether to interrupt communications over a first uplink resource grant to transmit communications over a second uplink resource grant that overlaps the resources of the first uplink resource grant in time and/or frequency. The determination may be based on the respective priorities of the resource grants and/or whether the UE 104 is capable of interrupting transmissions, as described herein.

Figure 2:
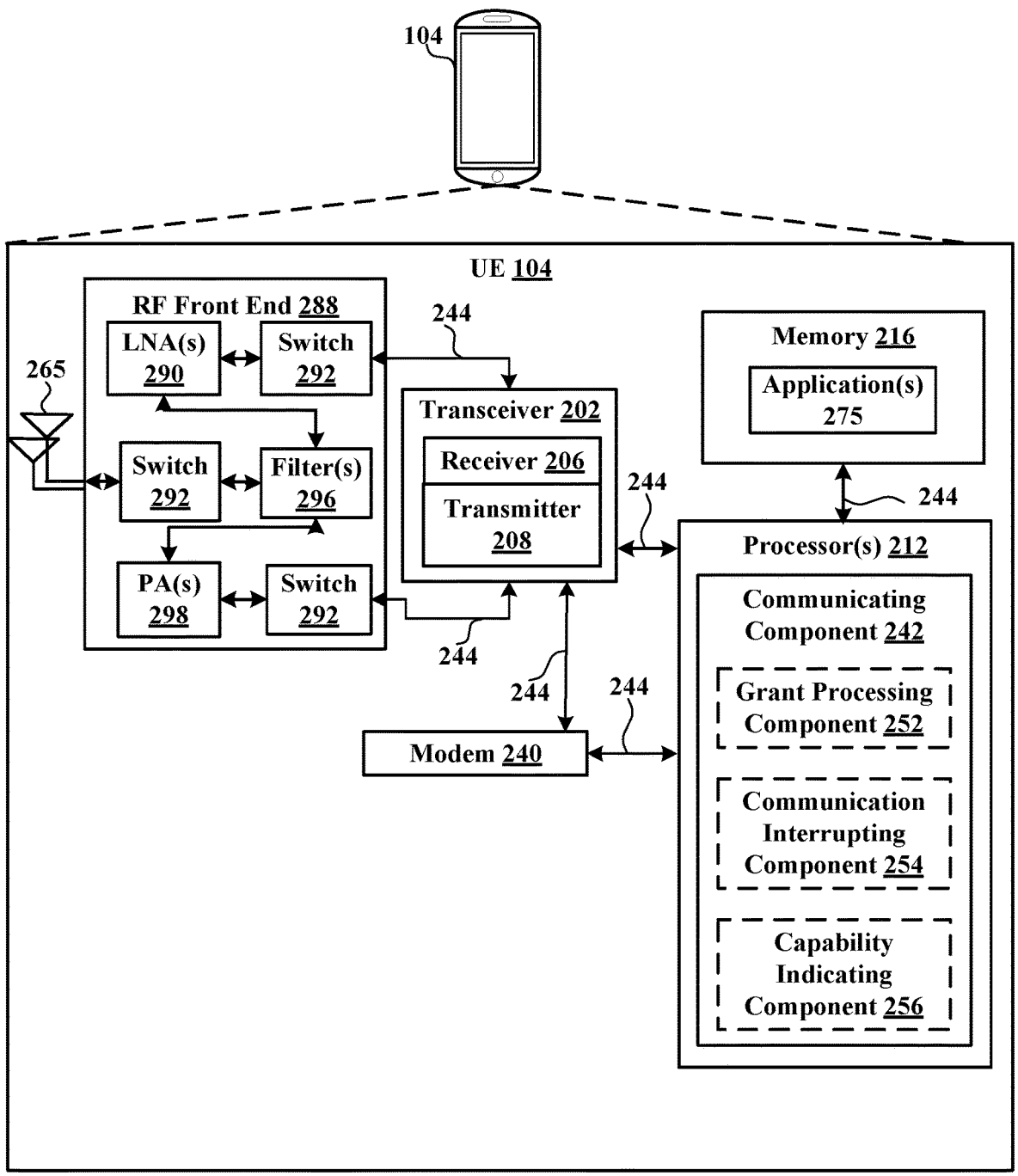
FIG. 2 is a block diagram illustrating an example of a UE, in accordance with various aspects of the present disclosure.
Figure 3:
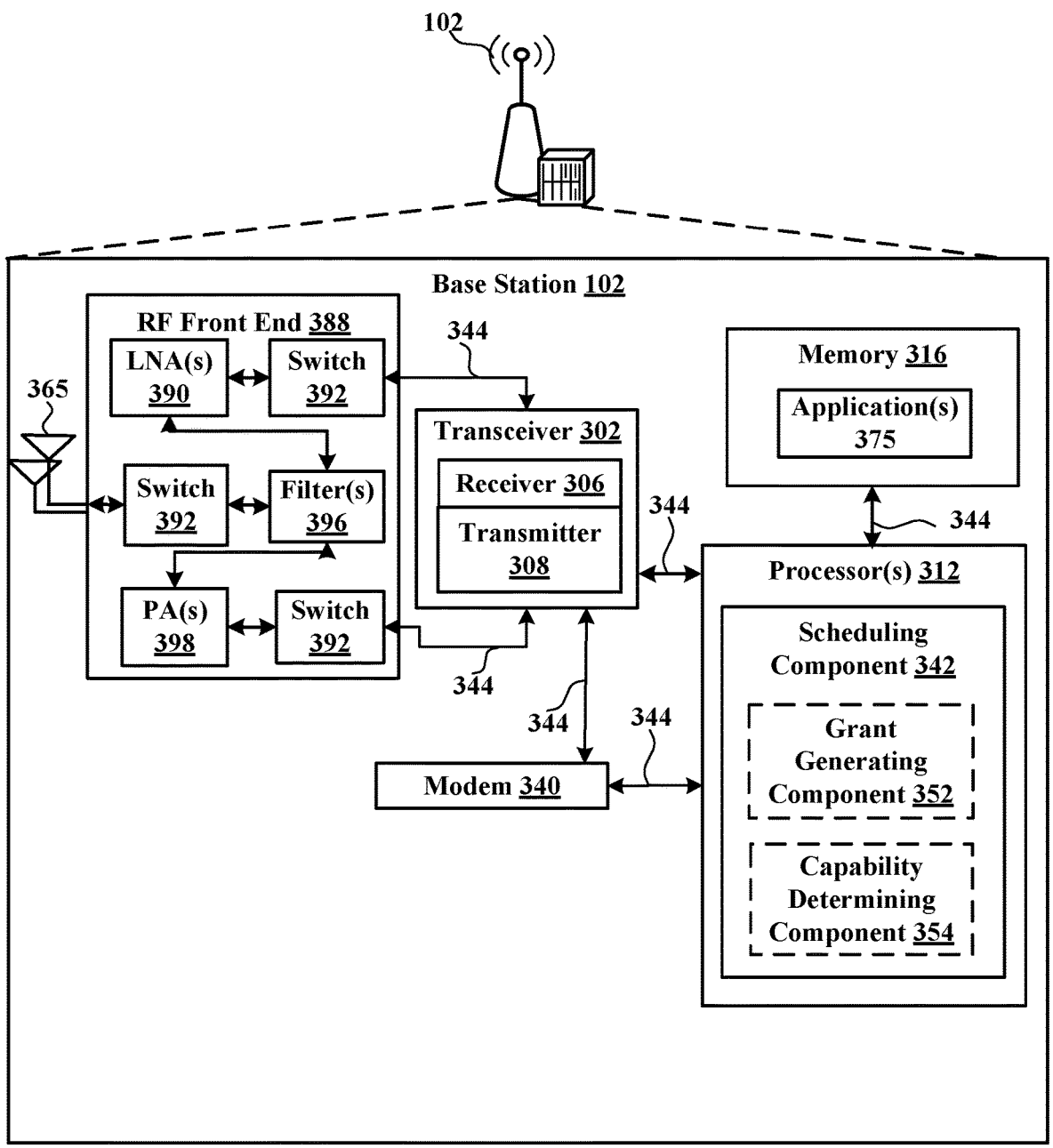
FIG. 3 is a block diagram illustrating an example of a base station, in accordance with various aspects of the present disclosure.
Figure 4:
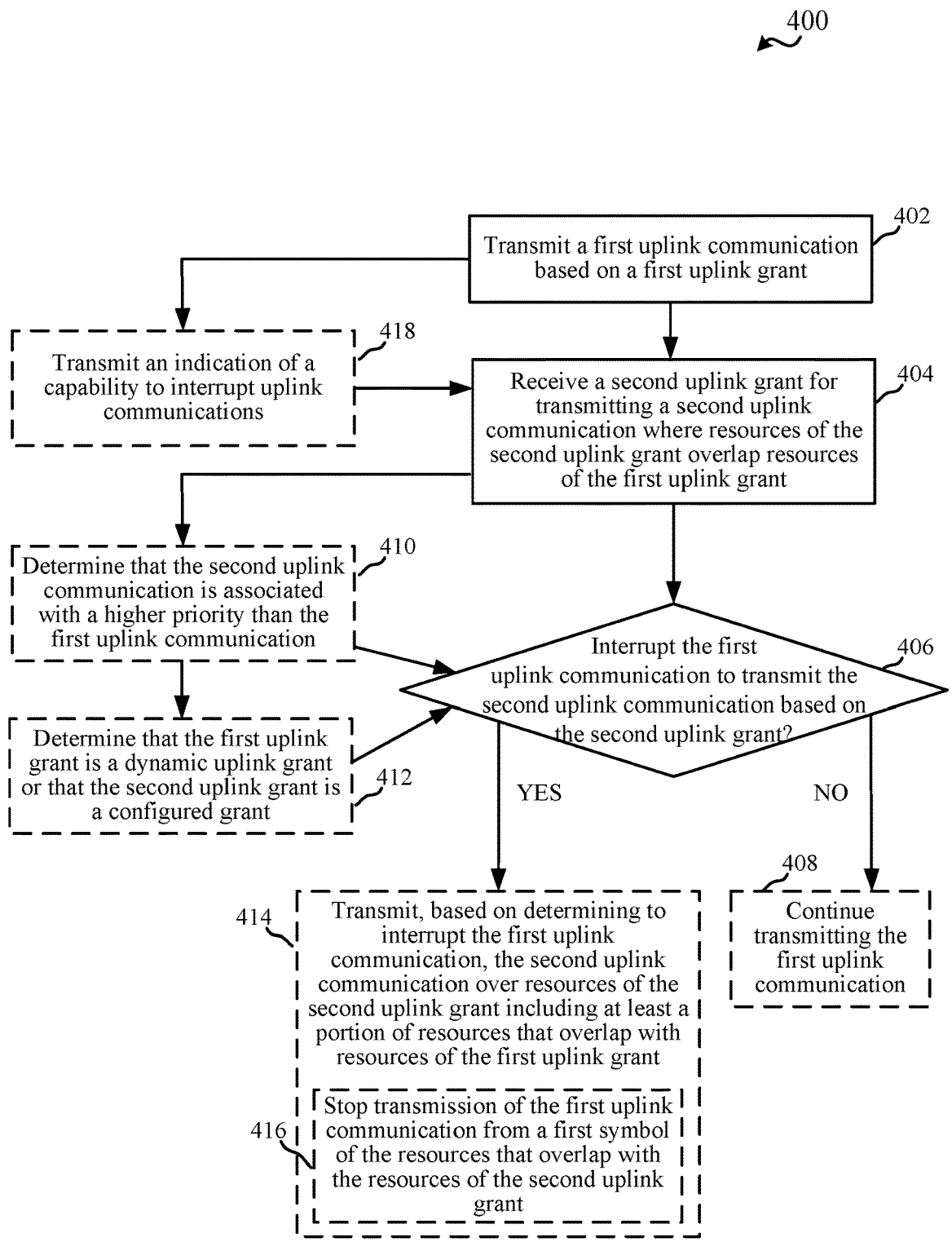
FIG. 4 is a flow chart illustrating an example of a method for determining whether to interrupt uplink communications where multiple uplink grants are received, in accordance with various aspects of the present disclosure.
Figure 5:
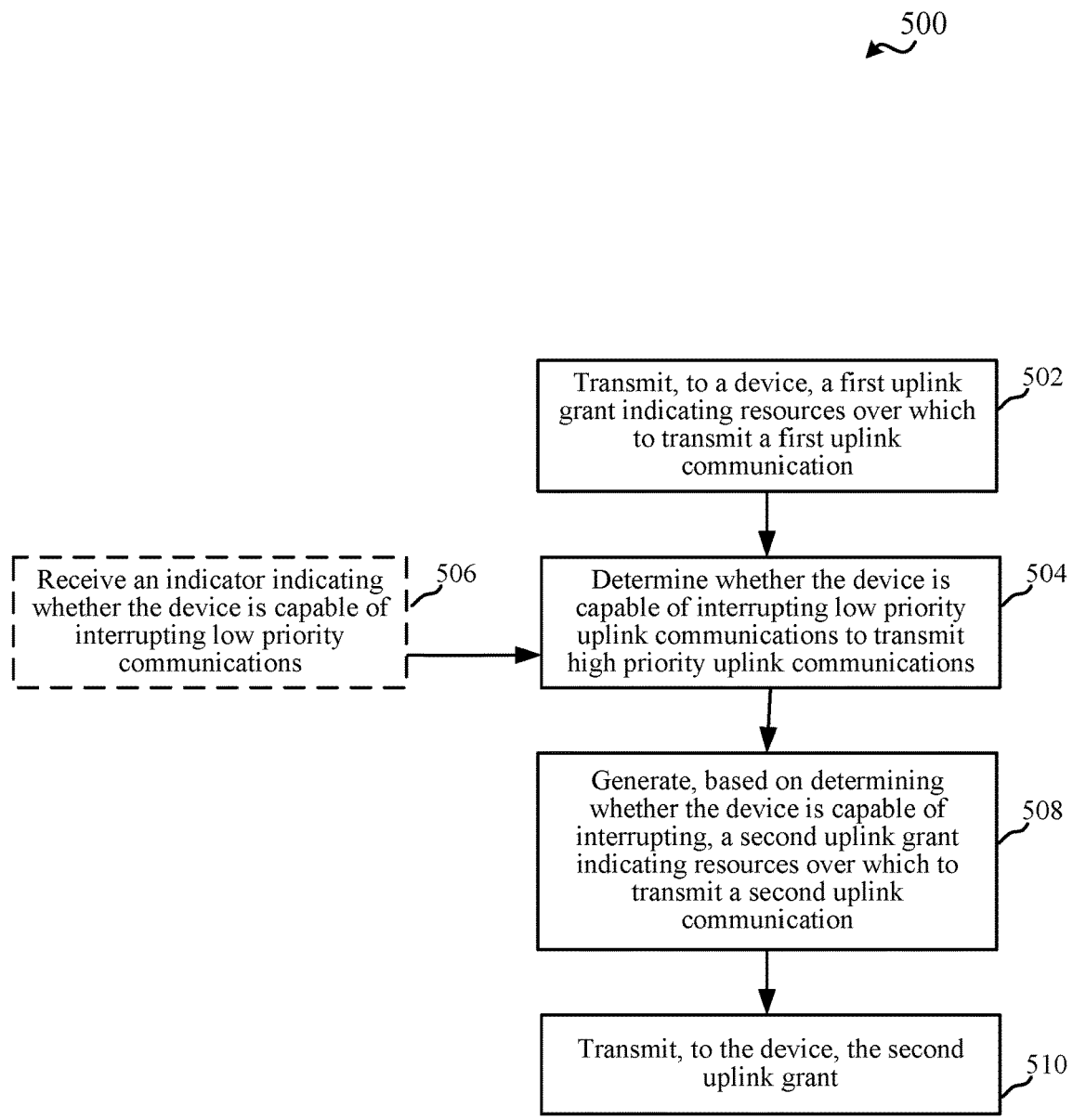
FIG. 5 illustrates an example of a system for scheduling multiple uplink grants for a device, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for determining whether to interrupt uplink communications, as described further herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a grant processing component 252 for processing multiple uplink resource grants received from a base station, which may include one or more CGs of varying priority, one or more DGs of varying priority, and/or the like, a communication interrupting component 254 for determining whether to interrupt a first uplink communication over a first uplink resource grant to transmit a second uplink communication over a second uplink resource grant (e.g., based on priority of the communications), and/or a capability indicating component 256 for indicating whether the device is capable of interrupting uplink communications, types of resource grants for which the UE 104 is capable of interrupting communications, other scenarios during which the UE 104 is capable of interrupting communications, etc., as described further herein.

In an aspect, the processor(s) 212 may correspond to one or more of the processors described in connection with the UE in FIG. 6. Similarly, the memory 216 may correspond to the memory described in connection with the UE in FIG. 6.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling UEs for transmitting uplink communications based on one or more uplink resource grants, as described further herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a grant generating component 352 for generating multiple uplink resource grants for a UE 104, where the uplink resource grants may include one or more CGs of varying priority, one or more DGs of varying priority, and/or the like, and/or a capability determining component 354 for determining whether a UE is capable of interrupting uplink communications to transmit higher priority uplink communications, as described further herein.

In an aspect, the processor(s) 312 may correspond to one or more of the processors described in connection with the base station in FIG. 6. Similarly, the memory 316 may correspond to the memory described in connection with the base station in FIG. 6.

FIG. 4 illustrates a flow chart of an example of a method 400 for determining whether to interrupt a first uplink communication to transmit a second uplink communication. In an example, a UE 104 can perform the functions described in method 400 using one or more of the components described in FIGS. 1-2.

In method 400, at Block 402, a first uplink communication can be transmitted based on a first uplink grant. In an aspect, grant processing component 252, e.g., in conjunction with processor(s) 212, memory 216, transceiver 202, communicating component 242, etc., can receive (e.g., from a base station 102) a first uplink grant, and communicating component 242 can transmit the first uplink communication based on the first uplink grant. For example, the first uplink grant can be a CG, which may be configured using RRC signaling from the base station 102 and may include an indication of priority (e.g., HP or LP or other level). In another example, the first uplink grant can be a DG, which may be configured using DCI transmitted by the base station 102 over a control channel (e.g., PDCCH) and may include an indication of priority (e.g., HP or LP or other level). In addition, the first uplink grant may indicate frequency resources over a period of time during which the UE 104 can transmit the first uplink communication. For example, the period of time may include one or more symbols, slots, subframes, etc., as described above.

In method 400, at Block 404, a second uplink grant for transmitting a second uplink communication can be received where resources of the second uplink grant overlap resources of the first uplink grant. In an aspect, grant processing component 252, e.g., in conjunction with processor(s) 212, memory 216, transceiver 202, communicating component 242, etc., can receive (e.g., from the base station 102) the second uplink grant for transmitting the second uplink communication where resources of the second uplink grant overlap resources of the first uplink grant. For example, the resources may overlap in frequency (e.g., using at least a portion of the same subcarrier(s)) or in time (e.g., using at least a portion of the same symbol, as described herein), etc. In some examples, aspects described herein can be applied where the resources are on the same component carrier and/or overlap in time, such that the grant processing component 252 can determine to apply collision rules or functions described herein in such cases.

For example, the second uplink grant can also be a CG, which may be configured using RRC signaling from the base station 102 and may include an indication of priority (e.g., HP or LP or other level). In another example, the second uplink grant can also be a DG, which may be configured using DCI transmitted by the base station 102 over a control channel (e.g., PDCCH) and may include an indication of priority (e.g., HP or LP or other level). In a specific example, the first uplink grant can be a CG and the second uplink grant can be a DG. In a specific example, the first uplink grant can be a DG and the second uplink grant can be a CG. Moreover, in a specific example, the first and second uplink grants may be associated with different priorities. In addition, the second uplink grant may indicate frequency resources over a period of time during which the UE 104 can transmit second uplink communication, where the resources of the second uplink grant may at least partially overlap the resources of the first uplink grant (e.g., in frequency and/or in one or more associated periods of time).

In one example, the first and second uplink grants may be associated with communications of the same priority, in which case for CG and DG PUSCH collision, the uplink grant for DG can be received $N_2$ symbols in advance, as described further herein.

In method 400, at Block 406, it can be determined whether to interrupt the first uplink communication to transmit the second uplink communication based on the second uplink grant. In an aspect, communication interrupting component 254, e.g., in conjunction with processor(s) 212, memory 216, transceiver 202, communicating component 242, etc., can determine whether to interrupt the first uplink communication to transmit the second uplink communication. For example, communication interrupting component 254 can determine to interrupt the first uplink communication based on determining a priority of the first and second uplink communications, based on a type of resource grant of the first and second uplink grants (e.g., CG or DG), based on determining a capability of the UE 104 to interrupt uplink communications (transmissions), etc. In one example, uplink communications with different priorities (e.g., HP for one and LP for another) can be handled based on the functions described herein, and uplink communications with the same priority (e.g., HP or LP for both) can be handled based on other rules, such as those described above for 3GPP Release 15.

In one example, determining whether to interrupt the first uplink communication at Block 406 can include determining not to interrupt the first uplink communication in some scenarios. In one example, communication interrupting component 254 can determine not to interrupt the first uplink communication and can drop the second uplink communication based on a timeline, such as where scheduling of the second uplink communication does not comply with a number of symbols after the first uplink communication. For example, the UE 104 may expect to receive a PDCCH scheduling a HP DG-PUSCH at least $N_2$ symbols before the first symbol of a LP CG-PUSCH to be cancelled and/or may expect to receive PDCCH scheduling a LP DG-PUSCH at least $N_2$ symbols before the first symbol of a HP CG-PUSCH. Where the second uplink communication is scheduled by a PDCCH not received within this time window (or based on this timeline, which can be a number of symbols that is a function of $N_2$), communication interrupting component 254 can determine to drop the second uplink communication. Otherwise, where the second uplink communication is scheduled by a PDCCH is received within this time window (or based on this timeline, which can be a number of symbols that is a function of $N_2$), communication interrupting component 254 can determine to transmit the second uplink communication instead of the first uplink communication (e.g., to interrupt the first uplink communication in favor of the second uplink communication).

In an example, where it is determined to not interrupt the first uplink communication at Block 406, optionally at Block 408, transmitted the first uplink communication can be continued. In an aspect, communicating component 242, e.g., in conjunction with processor(s) 212, memory 216, transceiver 202, etc., can continue transmitting the first uplink communication and can drop, or postpone, the second uplink communication.

In other examples, communicating interrupting component 254 can determine to interrupt the first uplink communication based on a priority associated with the uplink communications, whether a grant scheduling the uplink communications is CG or DG, and/or the like, as described further herein.

In method 400, optionally at Block 410, it can be determined that the second uplink communication is associated with a higher priority than the first uplink communication. In an aspect, communication interrupting component 254, e.g., in conjunction with processor(s) 212, memory 216, transceiver 202, communicating component 242, etc., can determine that the second uplink communication is associated with a higher priority than the first uplink communication. As described, for example, the priority values of the uplink communications can be indicated in the corresponding grants, and communication interrupting component 254 can compare these priority values to determine which uplink communication is of a higher priority (and may accordingly interrupt the lower priority uplink communication, in one example). In an example, communication interrupting component 254 can determine to interrupt the first uplink communication to transmit the second uplink communication based at least in part on this determination.

In method 400, optionally at Block 412, it can be determined that the first uplink grant is a DG or that the second uplink grant is a CG. In an aspect, communication interrupting component 254, e.g., in conjunction with processor(s) 212, memory 216, transceiver 202, communicating component 242, etc., can determine that the first uplink grant is a DG or that the second uplink grant is a CG. In an example, communication interrupting component 254 can determine to interrupt the first uplink communication to transmit the second uplink communication based at least in part on this determination. In another example, communication interrupting component 254 can determine to interrupt the first uplink communication to transmit the second uplink communication based on this determine and based on a determination of priority value, as described above with reference to Block 408.

In a specific example, where communication interrupting component 254 determines that the first uplink grant is a DG for LP communications and that the second uplink grant is a CG for HP communications (or that the second uplink CG is otherwise for higher priority communications than the first uplink DG), communication interrupting component 254 can determine to interrupt transmission of the first uplink communication (e.g., an ongoing LP DG-PUSCH transmission) in favor of transmitting the second uplink communication (e.g., a HP CG-PUSCH transmission). As described further herein in this example, as part of interrupting the first uplink communication, the UE 104 can stop the transmission of the LP DG-PUSCH and/or begin transmission of the HP CG-PUSCH starting from the first overlapping symbol. For example, the HP DG-PUSCH scheduling can be under the control of the base station (e.g., gNB), and its timing can be controlled to avoid interrupting an ongoing transmission. In the above example, however, the base station does not know when the UE is going to transmit a HP traffic over the CG-PUSCH resources, and communication interrupting component 254 can accordingly handle interruption on the UE side as avoiding interruption by the scheduler of the base station may not be possible.

In another specific example, where communication interrupting component 254 determines that the first uplink grant is a CG for LP communications and that the second uplink grant is a DG for HP communications (or that the second uplink DG is otherwise for higher priority communications than the first uplink CG), communication interrupting component 254 can determine to interrupt transmission of the first uplink communication (e.g., an ongoing LP CG-PUSCH transmission) in favor of transmitting the second uplink communication (e.g., a HP DG-PUSCH transmission). As described further herein in this example, as part of interrupting the first uplink communication, the UE can stop the transmission of the LP CG-PUSCH and/or begin transmission of the HP DG-PUSCH starting from the first overlapping symbol.

In method 400, optionally at Block 414, where it is determined to interrupt the first uplink communication at Block 406, the second uplink communication can be transmitted over resources of the second uplink grant, including at least a portion of resources that overlap with resources of the first uplink grant, based on determining to interrupt the first uplink communication. In an aspect, communicating component 242, e.g., in conjunction with processor(s) 212, memory 216, transceiver 202, etc., can transmit, based on determining to interrupt the first uplink communication, the second communication over resources of the second uplink grant including at least a portion of resources than overlap with resources of the first uplink grant. For example, communicating component 242 can transmit the second uplink communication instead of the first uplink communication over at least the overlapped resources (e.g., starting from a first overlapped symbol).

In one example, in transmitting the second uplink communication at Block 414, optionally at Block 416, transmission of the first uplink communication can be stopped from a first symbol over the resources that overlap with the resources of the second uplink grant. In an aspect, communicating component 242, e.g., in conjunction with processor(s) 212, memory 216, transceiver 202, etc., can stop transmission of the first uplink communication from the first symbol of the resources (of the first uplink grant) that overlap with resources of the second uplink grant. For example, the first symbol can refer to the first occurring symbol in time (e.g., the first occurring symbol in time of the first uplink grant that overlaps with a symbol of the second uplink grant). Communicating component 242 can stop the transmission of the first uplink communication at this point to instead transmit the second uplink communication over the first overlapping symbol or other time period and continuing for a duration of the second uplink communication. In this regard, for example, communicating component 242 can drop or otherwise refrain from transmitting the remainder of the first uplink communication. Said differently, for example, communicating component 242 can stop transmission of the first uplink communications over a first symbol that is overlapped by the resources of the second uplink grant. Communicating component 242 can instead begin transmitting the second uplink communication over resources of the second uplink grant based on determining to prioritize the second uplink communication, as described above.

In method 400, optionally at Block 418, an indication of a capability to interrupt uplink communications can be transmitted. In an aspect, capability indicating component 256, e.g., in conjunction with processor(s) 212, memory 216, transceiver 202, communicating component 242, etc., can transmit (e.g., to the base station) the indication of the capability to interrupt uplink communications. In this example, as described further herein, the base station 102 may determine whether and/or how to schedule uplink grants based on the capability. For example, the indication may correspond to a capability to generally interrupt uplink transmissions, a capability to specifically interrupt LP communications over a CG to transmit HP communications over a DG, a capability to specifically interrupt LP communications over a DG to transmit HP communications over a CG, and/or the like. Where the UE 104 is not capable of interrupting communications in one or more scenarios, the base station 102 can determine to schedule resources for certain uplink communications without possibility of conflict, as described further herein.

In an example, a capability may not need to be indicated. For example, a UE 104 may be configured to receive the resource grants ahead of time. Where the DG PUSCH grants comes $N_2$ symbols ahead of time, communication interrupting component 254 can look at the priorities and decide which channel to transmit. This can be done where the grants are DG-PUSCH for HP transmissions and CG-PUSCH for LP transmissions, where the grants are DG-PUSCH for LP transmissions and CG-PUSCH for HP transmissions, or both, etc.

FIG. 5 illustrates a flow chart of an example of a method 500 for configuring uplink grants for a device based on an indicated capability to support interrupting of uplink communications. In an example, a base station 102 (e.g., in conjunction with other network components of radio access network (RAN), backend core network, etc., or otherwise) can perform the functions described in method 500 using one or more of the components described in FIGS. 1-3.

In method 500, at Block 502, a first uplink grant indicating resources over which to transmit a first uplink communication can be transmitted to a device. In an aspect, grant generating component 352, e.g., in conjunction with processor(s) 312, memory 316, transceiver 302, scheduling component 342, etc., can generate and transmit, to the device (e.g., to a UE 104), the first uplink resource grant indicating resources over which to transmit the first uplink communication. For example, the first uplink grant can be a CG, which grant generating component 352 may configure using RRC signaling and/or may include an indication of priority (e.g., HP or LP or other level). In another example, the first uplink grant can be a DG, which grant generating component 352 may configure using DCI transmitted by the base station 102 over a control channel (e.g., PDCCH) and/or may include an indication of priority (e.g., HP or LP or other level). In addition, the first uplink grant may indicate frequency resources over a period of time during which the device can transmit the first uplink communication. For example, the period of time may include one or more symbols, slots, subframes, etc., as described above.

In method 500, at Block 504, it can be determined whether the device is capable of interrupting low priority uplink communications to transmit high priority uplink communications. In an aspect, capability determining component 354, e.g., in conjunction with processor(s) 312, memory 316, transceiver 302, scheduling component 342, etc., can determine whether the device is capable of interrupting low priority uplink communications to transmit high priority uplink communications (e.g., communications of higher priority than the low priority uplink communications). For example, capability determining component 354 may determine this capability of the device based on a device class or version, a device type, an indication of capability received from the device, etc.

In method 500, optionally at Block 506, an indicator indicating whether the device is capable of interrupting low priority communications can be received. In an aspect, capability determining component 354, e.g., in conjunction with processor(s) 312, memory 316, transceiver 302, scheduling component 342, etc., can receive (e.g., from the UE 104) an indicator indicating whether the device is capable of interrupting low priority communications. As described, for example, the indication may correspond to a capability to generally interrupt uplink transmissions, a capability to specifically interrupt LP communications over resources of an uplink CG to transmit HP communications over a DG, a capability to specifically interrupt LP communications over resources of an uplink DG to transmit HP communications over a CG, and/or the like. As described, interrupting communications can refer to suspending an ongoing transmission (e.g., a LP transmission) to transmit another transmission (e.g., a HP transmission). In an example, capability determining component 354 can receive the indication from the UE in RRC signaling or other higher layer signaling along with other UE capability information for supporting other features in communicating with the base station 102.

In an example, capability determining component 354 can determine whether the device is capable of interrupting LP communications to transmit HP communications based on the determined or indicated capability and/or based on a scenario associated with the communications (e.g., based on whether the communications being interrupted are LP and/or are associated with a CG or a DG, based on whether the communications to transmit are HP and/or are associated with a DG or a CG, etc.). In an example, capability determining component 354 can include similar logic as described above with respect to communication interrupting component 254 of a UE 104 to determine whether a UE 104 is capable of and/or is going to interrupt first uplink communications to transmit second uplink communications in overlapping resources. In an example, scheduling component 342 may determine how to schedule a second uplink grant based on these determinations.

Thus, in method 500, at Block 508, a second uplink grant indicating resources over which to transmit a second uplink communication can be generated based on determining whether the device is capable of interrupting. In an aspect, grant generating component 352, e.g., in conjunction with processor(s) 312, memory 316, transceiver 302, scheduling component 342, etc., can generate, based on determining whether the device is capable of interrupting, the second uplink grant indicating resources over which to transmit the second uplink communication.

In one example, where the device is not capable of interrupting communications, or is otherwise not capable of interrupting communications in a specific scenario that is occurring (e.g., not capable of interrupting LP communications over CG resources for HP communications over DG resources or not capable of interrupting LP communications over DG resources for HP communications over CG resources), grant generating component 352 can generate the second uplink grant over resources that do not overlap the first uplink grant. Where the device is not capable of interrupting communications, in one example, where the first uplink grant is over CG resources, grant generating component 352 can generate the second uplink grant as a DG indicating resources that are at least some function of $N_2$ symbols before the first symbol of the CG resources, where $N_2$ can be as defined in third generation partnership project (3GPP) technical specification 38.214, section 6.4. In another example, grant generating component 352 can transmit the DG over a PDCCH that is at least some function of $N_2$ symbols before the first symbol of the CG resources. In any case, if the resources of the second uplink grant overlap those of the first uplink grant where the device is not capable of interrupting, this may be considered an error event at the device, as such a scheduling may not be expected by the UE 104.

Where the device is capable of interrupting communications, in one example, grant generating component 352 can generate the second uplink grant to include resources that overlap resources of the first uplink grant. For example, the UE 104 may be expected to stop (e.g., interrupt) transmission over the resources of the first uplink grant at a first symbol that overlaps resources of the second uplink grant in favor of transmitting over the resources of the second uplink grant.

In method 500, at Block 510, the second uplink grant can be transmitted to the device. In an aspect, grant generating component 352, e.g., in conjunction with processor(s) 312, memory 316, transceiver 302, scheduling component 342, etc., can transmit, to the device (e.g., UE 104), the second uplink grant. As described, for example, the second uplink grant may be a DG that indicates a priority of communications and may or may not include resources that overlap those of the first uplink grant (e.g., where the first uplink grant may be a CG associated with a different priority). In one example, where the communications corresponding to the first and second uplink grants are of the same priority, grant generating component 352 can transmit the second uplink grant (e.g., at least $N_2$ symbols) before the first uplink grant, as described and/or vice versa, to ensure uplink communications over resources of the grant do not conflict.

Figure 6:
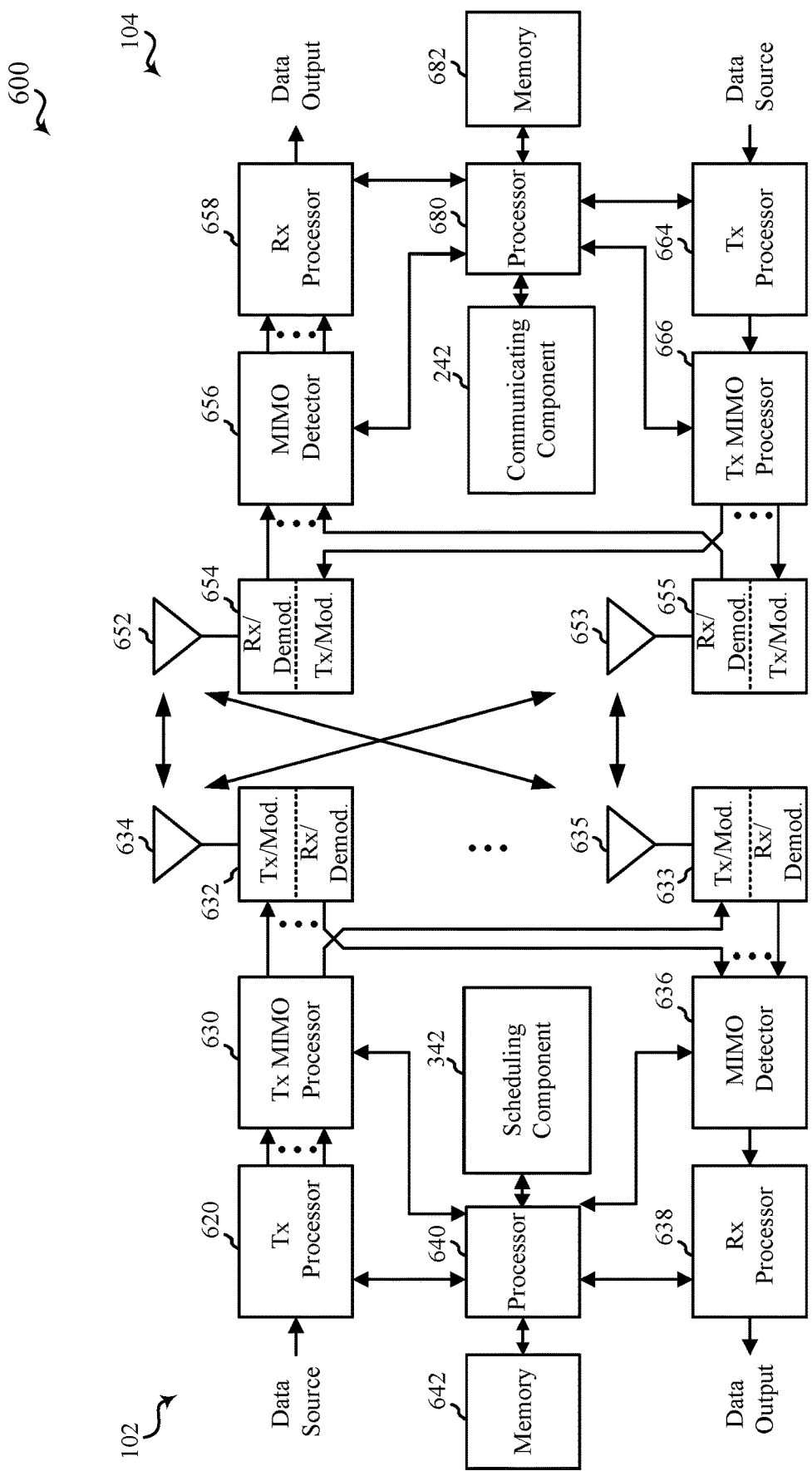
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including transmitting, to a base station, a first uplink communication based on a first uplink grant, receiving, from the base station, a second uplink grant for transmitting a second uplink communication, wherein resources of the second uplink grant overlap with resources of the first uplink grant in time and frequency, determining to interrupt the first uplink communication to transmit the second uplink communication based on the second uplink grant, and transmitting, to the base station and based on determining to interrupt the first uplink communication, the second uplink communication over the resources of the second uplink grant including at least a portion of resources that overlap with the resources of the first uplink grant.

In Aspect 2, the method of Aspect 1 includes wherein transmitting the second uplink communication comprises stopping transmission of the first uplink communications over a first symbol that is overlapped by the resources of the second uplink grant.

In Aspect 3, the method of any of Aspects 1 or 2 include wherein transmitting the second uplink communication comprises transmitting the second uplink communication beginning at a first overlapping symbol of the second uplink grant that overlaps the resources of the first uplink grant.

In Aspect 4, the method of any of Aspects 1 to 3 include, wherein determining to interrupt the first uplink communication is based at least in part on determining that the second uplink communication is associated with a higher priority than the first uplink communication.

In Aspect 5, the method of any of Aspects 1 to 4 include wherein determining to interrupt the first uplink communication is based at least in part on at least one of determining that the first uplink grant is a dynamic uplink grant and that the second uplink grant is a configured uplink grant, or determining that the first uplink grant is a configured uplink grant and that the second uplink grant is a dynamic uplink grant.

In Aspect 6, the method of any of Aspects 1 to 5 include transmitting, to the base station, an indication of a capability to interrupt uplink communications, wherein receiving the second uplink grant occurs based on the capability.

In Aspect 7, the method of Aspect 6 includes wherein the indication relates to the capability of at least one of interrupting a low priority uplink communication over resources of a configured grant to transmit a high priority uplink communication over resources of a dynamic grant, or interrupting a low priority uplink communication over resources of a dynamic grant to transmit a high priority uplink communication over resources of a configured grant.

Aspect 8 is a method for wireless communication including transmitting, to a device, a first uplink grant indicating resources over which to transmit a first uplink communication, determining whether the device is capable of interrupting low priority uplink communications to transmit high priority uplink communications, generating, based on whether the device is capable of interrupting, a second uplink grant indicating resources over which to transmit a second uplink communication, and transmitting, to the device, the second uplink grant.

In Aspect 9, the method of Aspect 8 includes receiving, from the device, an indicator indicating that the device is capable of interrupting low priority uplink communications.

In Aspect 10, the method of Aspect 9 includes wherein the indication indicates that the device is capable of at least one of interrupting a low priority uplink communication over resources of a configured grant to transmit a high priority uplink communication over resources of a dynamic grant, or interrupting a low priority uplink communication over resources of a dynamic grant to transmit a high priority uplink communication over resources of a configured grant.

In Aspect 11, the method of any of Aspects 9 or 10 include wherein determining whether the device is capable of interrupting comprises determining that the device is not capable of interrupting, and wherein generating the second uplink grant comprises generating the second uplink grant to be received a number of symbols before a first symbol of the resources of the first uplink grant.

In Aspect 12, the method of any of Aspects 9 to 11 include wherein determining whether the device is capable of interrupting comprises determining that the device is capable of interrupting, and wherein generating the second uplink grant comprises generating the second uplink grant to indicate resources overlapping with the resources of the first uplink grant.

Aspect 13 is an apparatus for wireless communication including a memory configured to store instructions, and one or more processors communicatively coupled with the memory, wherein the one or more processors are configured to execute the instructions to perform the operations of one or more methods in any of Aspects 1 to 12.

Aspect 14 is an apparatus for wireless communication including means for performing the operations of one or more methods in any of Aspects 1 to 12.

Aspect 15 is a computer-readable medium including code executable by one or more processors to perform the operations of one or more methods in any of Aspects 1 to 12.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   transmitting, to a base station, an indication of one of: whether interrupting a low priority uplink communication over resources of a configured grant to transmit a high priority uplink communication over resources of a dynamic grant is supported; or whether interrupting a low priority uplink communication over resources of a dynamic grant to transmit a high priority uplink communication over resources of a configured grant is supported;
   initiating a transmission, to the base station, of a first uplink communication based on a first uplink grant;
   receiving, from the base station, a second uplink grant for transmitting a second uplink communication, wherein resources of the second uplink grant overlap with resources of the first uplink grant in time or frequency; and
   interrupting, based on the indication, the transmission of the first uplink communication to transmit the second uplink communication over the resources of the second uplink grant including at least a portion of the resources of the second uplink grant that overlap with the resources of the first uplink grant, wherein the first uplink grant is one of a dynamic uplink grant or a configured uplink grant and the second uplink grant is the other one of the dynamic uplink grant or the configured uplink grant.

2. The method of claim 1, wherein interrupting the transmission of the first uplink communication includes stopping the transmission of the first uplink communications over a first symbol that is overlapped by the resources of the second uplink grant.

3. The method of claim 1, wherein transmitting the second uplink communication comprises transmitting the second uplink communication beginning at a first overlapping symbol of the second uplink grant that overlaps the resources of the first uplink grant.

4. The method of claim 1, wherein interrupting the transmission of the first uplink communication is based at least in part on determining that the second uplink communication is associated with a higher priority than the first uplink communication.

5. The method of claim 1, wherein interrupting the transmission of the first uplink communication is based at least in part on the first uplink grant being the dynamic uplink grant and the second uplink grant being the configured uplink grant.

6. The method of claim 1, wherein interrupting the transmission of the first uplink communication is based at least in part on the first uplink grant being the configured uplink grant and the second uplink grant being the dynamic uplink grant.

7. The method of claim 1, wherein interrupting the transmission of the first uplink communication is further based at least in part on determining that the second uplink grant is received at least a number of symbols before a first symbol indicated by the first uplink grant for the first uplink communication to be interrupted.

8. A method for wireless communication, comprising:
   receiving, from a device, an indication of one of: whether interrupting a low priority uplink communication over resources of a configured grant to transmit a high priority uplink communication over resources of a dynamic grant is supported; or whether interrupting a low priority uplink communication over resources of a dynamic grant to transmit a high priority uplink communication over resources of a configured grant is supported;
   transmitting, to the device, a first uplink grant indicating resources over which to transmit a first uplink communication;
   determining, based on the indication, whether the device is capable of interrupting low priority uplink communications to transmit high priority uplink communications;
   generating, based on whether the device is capable of interrupting low priority uplink communications to transmit high priority uplink communications, a second uplink grant indicating resources over which to transmit a second uplink communication; and
   transmitting, to the device, the second uplink grant.

9. The method of claim 8, wherein determining whether the device is capable of interrupting comprises determining that the device is not capable of interrupting, and wherein generating the second uplink grant comprises generating the second uplink grant to be received a number of symbols before a first symbol of the resources of the first uplink grant.

10. The method of claim 8, wherein determining whether the device is capable of interrupting comprises determining that the device is capable of interrupting, and wherein generating the second uplink grant comprises generating the second uplink grant to indicate resources overlapping with the resources of the first uplink grant.

11. An apparatus for wireless communication, comprising:
    a transceiver;
    a memory configured to store instructions; and
    one or more processors communicatively coupled with the memory and the transceiver, wherein the one or more processors are configured to:
       transmit, to a base station, an indication of one of: whether interrupting a low priority uplink communication over resources of a configured grant to transmit a high priority uplink communication over resources of a dynamic grant is supported; or whether interrupting a low priority uplink communication over resources of a dynamic grant to transmit a high priority uplink communication over resources of a configured grant is supported;

initiate transmission, to the base station, of a first uplink communication based on a first uplink grant;

receive, from the base station, a second uplink grant for transmitting a second uplink communication, wherein resources of the second uplink grant overlap with resources of the first uplink grant in time or frequency; and interrupt, based on the indication, the transmission of the first uplink communication to transmit the second uplink communication over the resources of the second uplink grant including at least a portion of the resources of the second uplink grant that overlap with the resources of the first uplink grant, wherein the first uplink grant is one of a dynamic uplink grant or a configured uplink grant and the second uplink grant is the other one of the dynamic uplink grant or the configured uplink grant.

12. The apparatus of claim 11, wherein the one or more processors are configured to interrupt the transmission of the first uplink communication at least in part by stopping the transmission of the first uplink communication over a first symbol that is overlapped by the resources of the second uplink grant.

13. The apparatus of claim 11, wherein the one or more processors are configured to transmit the second uplink communication at least in part by transmitting the second uplink communication beginning at a first overlapping symbol of the second uplink grant that overlaps the resources of the first uplink grant.

14. The apparatus of claim 11, wherein the one or more processors are configured to interrupt the transmission of the first uplink communication based at least in part on determining that the second uplink communication is associated with a higher priority than the first uplink communication.

15. The apparatus of claim 11, wherein the one or more processors are configured to interrupt the first uplink communication based at least in part on the first uplink grant being the dynamic uplink grant and the second uplink grant being the configured uplink grant.

16. The apparatus of claim 11, wherein the one or more processors are configured to interrupt the first uplink communication based at least in part on the first uplink grant being the configured uplink grant and the second uplink grant being the dynamic uplink grant.

17. The apparatus of claim 11, wherein the one or more processors are configured to interrupt the first uplink communication further based at least in part on determining that the second uplink grant is received at least a number of symbols before a first symbol indicated by the first uplink grant for the first uplink communication to be interrupted.

18. An apparatus for wireless communication, comprising:

a transceiver;

a memory configured to store instructions; and one or more processors communicatively coupled with the memory and the transceiver, wherein the one or more processors are configured to:

receive, from a device, an indication of one of: whether interrupting a low priority uplink communication over resources of a configured grant to transmit a high priority uplink communication over resources of a dynamic grant is supported; or whether interrupting a low priority uplink communication over resources of a dynamic grant to transmit a high priority uplink communication over resources of a configured grant is supported;

transmit, to the device, a first uplink grant indicating resources over which to transmit a first uplink communication;

determine, based on the indication, whether the device is capable of interrupting low priority uplink communications to transmit high priority uplink communications;

generate, based on whether the device is capable of interrupting low priority uplink communications to transmit high priority uplink communications, a second uplink grant indicating resources over which to transmit a second uplink communication; and transmit, to the device, the second uplink grant.

19. The apparatus of claim 18, wherein the one or more processors are configured to determine that the device is not capable of interrupting, and wherein the one or more processors are configured to generate the second uplink grant to be received a number of symbols before a first symbol of the resources of the first uplink grant.

20. The apparatus of claim 18, wherein the one or more processors are configured to determine that the device is capable of interrupting, and wherein the one or more processors are configured to generate the second uplink grant to indicate resources overlapping with the resources of the first uplink grant.

* * * * *